3,384,554
METHOD FOR THE ACCURATE AND SPECIFIC ANALYTICAL DETERMINATION OF GLUCOSE
Lawrence F. Martin, New Orleans, La., assignor to the United States of America as represented by the Secretary of Agriculture
Filed Sept. 22, 1965, Ser. No. 489,437
14 Claims. (Cl. 195—103.5)

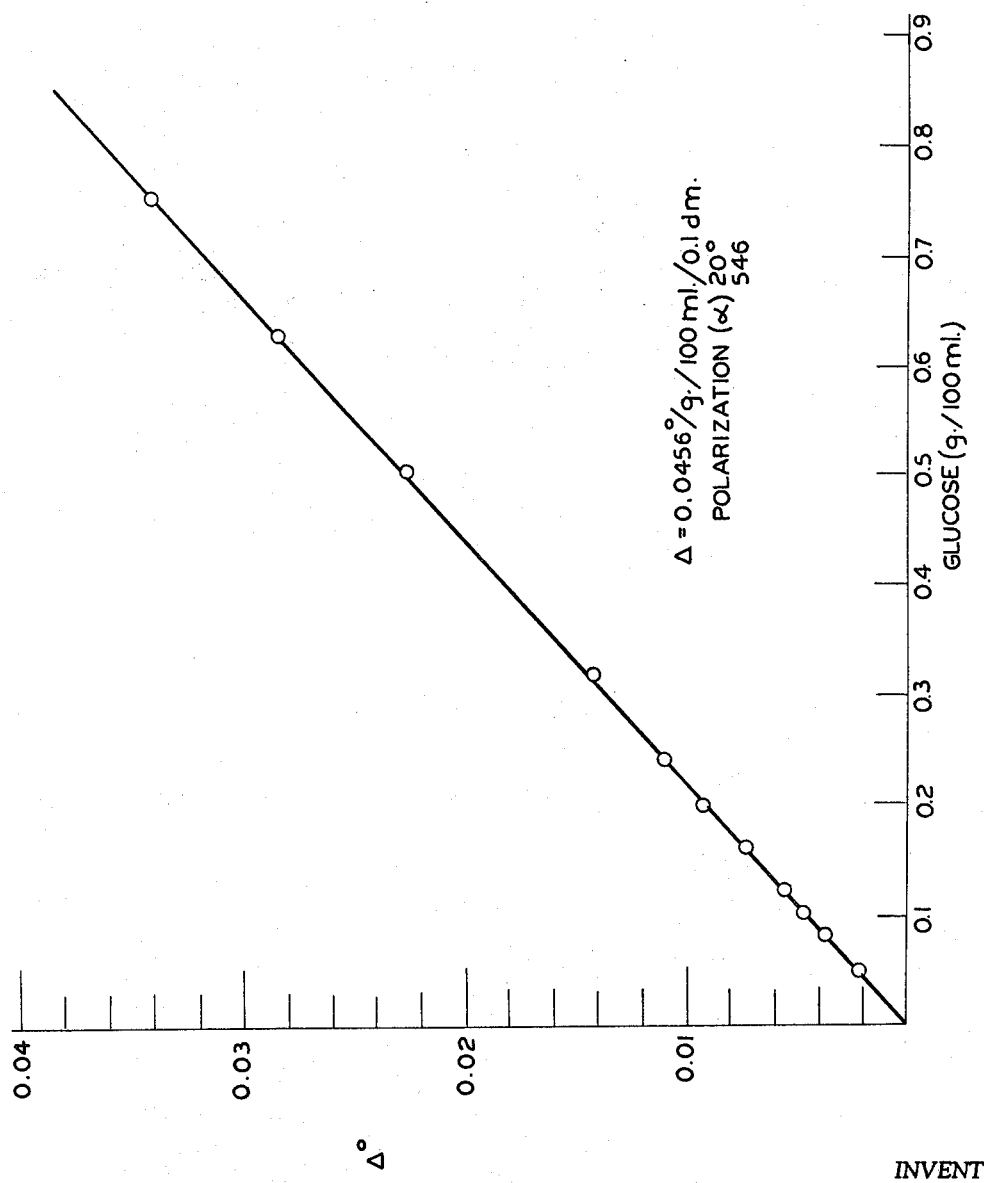

A non-exclusive, irrevocable, royalty-free license in the invention hereindescribed, throughout the world for all purposes of the United States Government, with the power to grant sublicenses for such purposes, is hereby granted to the Government of the United States of America.

This invention relates to a method for the accurate and specific determination of glucose in any material and industrial product containing this sugar, including those in which other sugars may be present. A more adequate analytical control is provided in the processing of industrial products containing glucose. The time, precision, and accuracy gained in practicing the method which is my invention can be converted to economic values of consequence.

The main object of this invention is to provide a new analytical method consisting of the combination of enzymatic oxidation of glucose by notatin(glucoseoxidase) with the polarimetric determination of the change in optical rotation produced. The simplification provided by my improved method affords a greater speed and quantity of determinations than that which had been possible before.

Analytical methods available prior to my invention are subject to a variety of limitations which render them inadequate for the determination of glucose, either with the precision or the specificity required for control of processing of industrial products containing glucose, and evaluation of the qualitiy of the finished product. Analysis capable of yielding data within 1% of the true glucose content of various industrial materials are essential for the control of processing conditions, standardization of product quality, and the reduction of losses in processing which result in substantial reductions in returns from the processing of agricultural products. A great variety and large volume of agricultural products contain glucose and/or carbohydrates of which glucose is a moiety, and undergo industrial processing into food products valued at billions of dollars. In addition to can and beet sugars and sirups, starches, corn sirup, bread, baked goods, confectionary, nonalcoholic beverages, and ice-cream are the principal examples of such commodities and products. Besides the glucose itself contained in these products and intermediate materials in their processing, other carbohydrates which may be made to yield glucose quantitatively by suitable hydrolyses may be determined indirectly. Examples are sucrose which is readily hydrolyzed by the enzyme, invertase, to yield stoichiometric equivalents of fructose and glucose, maltose which yields glucose upon enzymatic or acid hydrolysis, and starch which is determined most precisely by acid hydrolysis to yield an equivalent amount of glucose. Enzymes are known which liberate the glucose of the trisaccharide, raffinose, which is an important constituent of sugar beet juices, sirups, molasses and intermediate sugars.

A great variety of analytical methods have been proposed, and some adapted, for the determination of glucose or of total reducing substances, but all of these have been found lacking due to limitation in specificity, accuracy, or convenience in industrial operations necessitating the determination of glucose in large numbers of samples. In previous attempts to take advantage of the specificity of glucoseoxidase for the determination of glucose, reliance has been placed upon the use of large amounts of relatively crude enzyme preparations with hydrogen peroxide as the source of oxygen. In one such procedure developed by R. L. Whistler, L. Hough, and J. W. Hylm, Analytical Chemistry, 25, 1215 (1953), the estimation of glucose was based upon titration of the gluconic acid produced, and it was found to be necessary to heat the solutions to effect hydrolysis of the lactones assumed to be formed as initial reaction products. St. Böttger and W. Steinmetzer in "The Selective Enzymatic Determination of Sugars in Sugar Factory Products," Zeitschrift für die Zuckerindustrie, vol. 9, p. 16 (1959) employed a manometric procedure, which utilized the enzyme glucoseoxidase for the oxidation of glucose and other sugars which yield glucose upon hydrolysis in materials in beet sugar processing. This precise method is not suitable for routine analyses in process control and product quality evaluations because of the manometric techniques which are very time consuming and require painstaking manipulation. At the Thirteenth Session of the International Commission for Uniform Methods of Sugar Analysis, Hamburg (1962), Subject 4 (Reducing Sugars) p. 12, E. J. McDonald summarized the numerous attempts to apply this specific oxidative enzyme for analysis of materials containing glucose. Prior attempts to use the specific enzyme in colorimetric procedures yielded erroneous results because other reducing substances in molasses and other products interfere by reacting with the hydrogen peroxide required as an intermediate reaction step.

The novel analytical invention combines the enzymatic oxidation with the polarimetric determination of the change in optical rotation produced by the reaction. The procedure embodies the requirements of an accurate and specific method of the employment of glucoseoxidase and the rapid manipulation of the automatic polarimeter with high sensitivity and accuracy.

When glucose is oxidized to gluconic acid, the polarization of a solution decreases, and the change in optical activity is directly proportional to the amount of glucose present.

With the methods previously employed to measure the change produced by the enzyme, the nature of the end product of the reaction is not important, as the hydrogen peroxide evolved in stoichiometric proportion to glucose is determined indirectly in the colorimetric procedures, and the amount of oxygen consumed is measured by the manometric method. Under these conditions the glucose was shown to be transformed only into gluconolactone by dehydrogenation, as depicted in "Enzyme Mechanisms" by Malcolm Dixon and Edwin C. Webb, 2nd edition, Academic Press, Inc., New York (1946), p. 262. This reaction would be unsuitable for polarimetric measurement as the resulting change in rotation is small, and uncertain because of possible partial hydrolysis of the lactone end product which would be variable with differing reaction conditions. I have found that shaking the solution of glucose, enzyme, and potassium phosphate buffer adjusted initially to the pH between 6.0 and 6.8 with citric acid, with adequate access of oxygen results in hydrolysis of the intermediate lactone as rapidly as it is formed by the enzymatic dehydrogenation of the sugar. Thus the end product obtained stoichiometrically is gluconic acid, essential to produce the large and definite changes in polarization proportional to the amounts of glucose present. Formation of the acid lowers the pH, and it is desirable to add sufficient alkali after completion of the reaction so that the solution is essentially neutral, pH 6.5–7.5, to prevent possible lactone formation and permit determination of the polarizations of a number of oxidized samples at any conveninet time. Under these stabilized conditions the values obtained by polarization with the automatic instrument remain constant for several days.

The observed difference in rotation between that of the unoxidized and of the oxidized solutions has been found to have the value which may be calculated from the measured specific rotations of glucose, $[a]^{20}_{589}=52.7°$ or $$[a]^{20}_{546}=62.3°$$

and of gluconic acid in the form of its potassium salt, $[a]^{20}_{589}=12.2°$ or $[a]^{20}_{546}=15.2°$. The linearity of the change in polarization for pure glucose in concentrations of 0.05 to 0.75 g./100 ml. is shown in the figure, presenting data obtained for standardization of the analytical measurements which illustrate the basis of the quantitative method.

The enzyme glucoseoxidase is specific for the rapid oxidation of beta-D-glucose, and has no catalytic effect upon the oxidation of other sugars except mannose and xylose which are oxidized at less than 1% of the rate of oxidation of glucose, and maltose, galactose, and some uncommon sugars which are oxidized at much slower rates, as reported by Malcolm Dixon and Edwin C. Webb. The changes in rotation resulting from the presence of appreciable amounts of these sugars are quite negligible in the brief time required for complete conversion of glucose. Even the alpha form of D-glucose is oxidized at a rate only 0.65% that of the reaction of beta-D-glucose, but the alpha is converted rapidly to the beta-form by mutarotation as shown by D. Keilin and E. F. Hartree, Biochemical Journal, 42, 221 (1948); ibid 50, 331 (1952), so that all of the glucose present in an aqueous solution reacts in a relatively short time. Other glucoseoxidases from plant sources will oxidize glucose in the same manner, but will also oxidize rapidly numerous other sugars.

This analytical method, which is my present invention, can be utilized in various ways, flexible to the needs of the analyst. Generally, the invention can be described as an analytical method which can be used for:

(a) Measuring the true glucose content of glucose containing solutions which also contain a plurality of other carbohydrate materials, comprising oxidizing the glucose stoichiometrically to gluconic acid by reacting the glucose with oxygen in the presence of carbohydrate-free notatin, and measuring the change in optical rotation resulting from the reaction by means of a differential polarimeter with a sensitivity of 2 ten thousandths of a circular degree (0.0002°), (b) Measuring the amount of a particular carbohydrate selected from the group consisting of sucrose, maltose, raffinose, lactose, and starch, individually, which particular carbohydrate yields a fixed amount of glucose upon hydrolysis, in a solution which contains no more than one member of said group, is free of glucose and free of carbohydrate material other than said particular carbohydrate, which carbohydrate material will yield glucose upon hydrolysis, comprising hydrolyzing the said carbohydrate to obtain the glucose moiety and subsequently oxidizing the glucose stoichiometrically to gluconic acid by reacting the glucose with oxygen in the presence of notatin, and measuring the change in optical rotation resulting from the reaction by means of a differential polarimeter with a sensitivity of 2 ten thousandths of a circular degree (0.0002°), and (c) Measuring the amount of a particular carbohydrate which yields a fixed amount of glucose when hydrolyzed with a specific enzyme, in a solution which contains a plurality of carbohydrates but free of glucose, comprising hydrolyzing the said particular carbohydrate with the specific enzyme to obtain the glucose moiety, subsequently oxidizing the glucose with oxygen in the presence of notatin, and measuring the change in optical rotation of resulting from the reaction by means of a differential polarimeter with a sensitivity of 2 ten thousandths of a circular degree (0.0002°).

Ordinary saccharimeters in use in most sugar analytical laboratories may be utilized with the method of our invention, but the accuracy is less than that of chemical oxidation methods and the determinations are time consuming. This invention combines the specific enzymatic oxidation of glucose with the determination of the change in optical rotation by extremely sensitive photoelectric polarimeters.

The novel method consists in the oxidation of solutions containing samples of glucose by oxygen gas, catalyzed by the glucoseoxidase enzyme, followed by determination of the change in optical activity employing a differential polarimeter with a sensitivity of 2 ten thousandths of a circular degree (0.0002°). This combination of facilities yields analytical determinations of glucose within 1% of the true glucose content of solutions analyzed. The method expedites the determination by addition of sufficient glucoseoxidase to the sample to effect complete oxidation within less than an hour by shaking in a closed vessel connected to a supply of oxygen at moderate pressure. The procedure simulates the Warburg technique on a macro scale.

Rapidity in analyzing large numbers of samples can be achieved by simultaneous oxidation of a plurality of samples. Presently available shaking machines can accommodate sixteen samples at a time. Obviously, through a system of pulleys and belts a higher number of samples can be accommodated, but the horsepower of the motor would have to be increased. For most materials simple and rapid filtration through dry papers and funnels into dry flasks suffices to prepare the oxidized solutions for polarization; and recording of the rotations by the automatic polarimeter requires only one or two minutes for each solution, or not more than five minutes for determination of the difference in rotation between an oxidized and an unoxidized control solution, from which the amount of glucose in a sample can be calculated. The recorder chart of the instrument may be calibrated to read the percentages of glucose directly for fixed weights of samples of particular glucose containing materials.

This method affords the advantage of utilizing large amounts of samples, which is advantageous in the analysis of glucose-containing industrial products. A variety of colorimetric methods have been applied to determination of glucose with moderate accuracy in applications where extreme rapidity of the analyses is required and small amounts of samples are available, micro quantities of the sugar being determined in diluted solutions. These methods are based largely upon colorimetric determinations using coupled reactions that develop color by oxidation of a supplementary reagent. The accuracy of the determinations of glucose is not better than plus or minus 5%, but this is adequate for clinical use in which gross changes in glucose concentration of biological fluids are determined.

Samples of the industrial materials to which this method is particularly applicable, but not specifically limited, are available in large quantities; indeed, large composited samples are often taken to be representative of the composition of the bulk of the material to be analyzed. Greater accuracy is attained by conducting the determinations with aliquots containing the higher concentrations of glucose shown in the figure of the drawing from 0.3–0.7 g./100 ml. of the solutions to be polarized. The method is not limited to this range, but where desirable may be used with almost equal precision in determining the sugar in final concentrations of 0.05–0.15 g./100 ml., for which less of the enzyme is required to complete the oxidation. It is thus possible to analyze materials in which the concentrations of glucose are as low as 1–2 mg./ml., approaching the sensitivity of microcolorimetric procedures, with much greater accuracy, making the method adaptable for biochemical and related research, or clinical research in which more precise analyses may be desired.

Example 1

Samples of molasses weighing approximately 1 g. were weighed exactly, dissolved in water, and transferred to volumetric flasks in which the volume of the solutions was adjusted precisely to 50 ml. at 20° C. Aliquots of 15 ml. were made up to 50 ml. and kept for polarizations of the unoxidized reference or control solutions. Equal (15 ml.) aliquots were introduced into 50 ml. volumetric flasks equipped with tubulatured stopped for oxidation. A third 15 ml. aliquot of each sample was introduced into 50 ml. similarly equipped volumetric flasks, and sucrose in the molasses was inverted completely by addition of 5 ml. of a 0.25% solution of invertase (scales), heating for 15 minutes at 50° C., and cooling before addition of the reagents for oxidation.

The flasks containing solutions to be oxidized were attached by clamps to a conventional "wrist-action" shaking machine, the solid shafts of which had been replaced by tubing to serve as manifolds for introduction of oxygen. To each of these flasks was added 10 ml. of 0.6 M potassium phosphate-citrate guffer, pH 6.35, and 1 ml. of glucose oxidase solution containing 1 mg./ml. of the enzyme. For molasses and other products containing sucrose it is necessary to use a commercially available highly purified enzyme, free of invertase activity; however, the oxidizing activity of this grade of glucose oxidase is much greater than that of preparations from which invertase has not been removed, and 1 mg. suffices for complete oxidation of the glucose in the aliquots taken for analysis. The tubes were connected to the manifold, and air was displaced by passing oxygen through one loosely stoppered flask at a time. All of the flasks were then stoppered and shaken for 45 minutes. Upon completion of the reaction the tubulatured stoppers were removed and rinsed thoroughly into the flasks which were kept in a constant temperature room until the volume could be adjusted to exactly 50 ml. at 20° C.

Slight turbidity of the solutions, which interferes with measurements by the automatic polarimeter, was removed effectively by centrifuging in stoppered, stainless steel tubes for 15 minutes at 15,000 r.p.m. (27,000 g., max.). After equilibrating to 20° C. with the reference solutions and the instrument in the constant temperature room, polarizations were measured by passing some of each solution in turn through the cell of the polarimeter. Differences in polarization between the unoxidized reference solution and the oxidized solution, $\Delta°_0$, and between the latter and the preinverted, oxidized solution, $\Delta°_1$, were read directly from the calibrated recorder chart. The data obtained for a sample of sugar factory final molasses (blackstrap), and one of refinery final molasses are assembled in Table I.

Analyses of these two molasses were carried out by a more elaborate and time consuming—but not necessarily more precise—method in which the hexoses are separated from sucrose and nonsugar constituents for determination of glucose, fructose, and mannose. The values for glucose obtained by this procedure were 6.82% in the factory molasses, and 11.51% in the refinery product. Table I shows 6.78% and 11.63%, respectively, by the process of the present invention.

and oxidized solutions in final volumes of 100 ml. yielded a change of rotation of 0.0097°. The glucose content calculated from the factor, 0.0456°/g./100 ml. given in the figure of the drawing, was 0.2128 g. or 21.28% of the 1 g. of corn sirup in the aliquot taken for analysis. Duplicate analyses of 20 ml. aliquotes of the honey sample solution yielded differences in rotation ($\Delta$) of 0.0130° and 0.0135°, corresponding to 28.51% and 29.60% glucose, or an average of 29.06±0.5%.

I claim:

1. An analytical method for measuring the true glucose content of glucose containing solutions comprising oxidizing the glucose stoichiometrically to gluconic acid by reacting the glucose with oxygen in the presence of a carbohydrase free glucoseoxidase, and measuring the change in optical rotation resulting from the reaction by means of a polarimeter.

2. An analytical method for measuring the true glucose content of glucose containing solutions which also contain a plurality of other carbohydrate materials, comprising oxidizing the glucose stoichiometrically to gluconic acid by reacting the glucose with oxygen in the presence of carbohydrase-free notatin, and measuring the change in optical rotation resulting from the reaction by means of a differential polarimeter with a sensitivity of two ten thousandths of a circular degree (0.0002°).

3. An analytical method for measuring the amount of a particular carbohydrate, which particular carbohydrate yields a fixed amount of glucose upon hydrolysis, in a solution which is free of glucose and free of carbohydrate material other than said particular carbohydrate, comprising hydrolyzing the said particular carbohydrate to obtain the glucose moiety and subsequently oxidizing the glucose stoichiometrically to gluconic acid by reacting the glucose with oxygen in the presence of notatin, and measuring the change in optical rotation resulting from the reaction by means of a differential polarimeter with a sensitivity of 2 ten thousandths of a circular degree (0.0002°).

4. An analytical method for measuring the amount of a particular carbohydrate selected from the group consisting of sucrose, maltose, raffinose, lactose, and starch, individually, which particular carbohydrate yields a fixed amount of glucose upon hydrolysis, in a solution which contains no more than one member of said group, is free of unoxidized glucose and free of carbohydrate material other than said particular carbohydrate, comprising hydrolyzing the said particular carbohydrate to obtain the glucose moiety and subsequently oxidizing the glucose stoichiometrically to gluconic acid by reacting the glucose with oxygen in the presence of notatin, and measuring the change in optical rotation resulting from the reaction by means of a differential polarimeter with a sensitivity of 2 ten thousandths of a circular degree (0.0002°).

5. The method of claim 4 wherein the particular carbohydrate is sucrose.

6. The method of claim 4 wherein the particular carbohydrate is maltose.

7. The method of claim 4 wherein the particular carbohydrate is raffinose.

TABLE I

| Samples | $\alpha°_w$ | $\alpha°_o$ | $\Delta_o(\alpha°_w - \alpha°_o)$ | Glucose, wt. and percent | $\alpha°_1$ | $\Delta(\alpha°_o - I\ \alpha°_1)$ | Sucrose, wt. and percent |
|---|---|---|---|---|---|---|---|
| Factory mol. wt. 1.0030 g., solids 77.16%. | +.0706 | +.0610 | .0096 | .0523 g., 6.78% (on solids). | −.1071 | .1681 | .3309 g., 42.90% (on solids). |
| Refinery mol. wt. 0.9950 g., solids 73.97%. | +.0815 | +.0658 | .0157 | .0858 g., 11.67% (on solids). | −.0808 | .1466 | .2889 g., 39.26% (on solids). |

NOTE.—Sugars, g./50 ml./0.2 dm.: Glucose=$\Delta°_o$/.184, sucrose=$\Delta°_1$/.508; polarizations calculated to total sample weight in 50 ml.

Example 2

Samples of 5 g. each of commercial honey and corn sirup were separately dissolved in volumes of exactly 100 ml. and 20 ml. aliquots were analyzed as in Example 1. For the corn sirup, polarizations of the unoxidized 8. The method of claim 4 wherein the particular carbohydrate is lactose.

9. The method of claim 4 wherein the particular carbohydrate is starch.

10. An analytical method for measuring the amount of a particular carbohydrate which yields a fixed amount of glucose when hydrolyzed with a specific enzyme, in a solution which contains a plurality of carbohydrates but free of unoxidized glucose, comprising hydrolyzing only the said particular carbohydrate with the specific enzyme to obtain the glucose moiety, subsequently oxidizing the glucose with oxygen in the presence of notatin, and measuring the change in optical rotation resulting from the reaction by means of a differential polarimeter with a sensitivity of 2 ten thousandths of a circular degree (0.0002°).

11. An analytical method for measuring the amount of sucrose in a solution containing a plurality of carbohydrates but no unoxidized glucose, comprising hydrolyzing the sucrose with invertase to obtain the glucose moiety, subsequently oxidizing the glucose stoichiometrically to gluconic acid by reacting the glucose with oxygen in the presence of notatin, and measuring the change in optical rotation resulting from the reaction by means of a differential polarimeter with a sensitivity of 2 ten thousandths of a circular degree (0.0002°).

12. An analytical method for measuring the amount of maltose in a solution containing a plurality of carbohydrates but no unoxidized glucose, comprising hydrolyzing the maltose with maltase to obtain the glucose moiety, subsequently oxidizing the glucose stoichiometrically to gluconic acid by reacting the glucose with oxygen in the presence of notatin, and measuring the change in optical rotation resulting from the reaction by means of a differential polarimeter with a sensitivity of 2 ten thousandths of a circular degree (0.0002°).

13. An analytical method for measuring the amount of raffinose in a solution containing a plurality of carbohydrates but no unoxidized glucose, comprising hydrolyzing the raffinose with invertase-melibiase to obtain the glucose moiety, subsequently oxidizing the glucose stoichiometrically to gluconic acid by reacting the glucose with oxygen in the presence of notatin, and measuring the change in optical rotation resulting from the reaction by means of a differential polarimeter with a sensitivity of 2 ten thousandths of a circular degree (0.0002°).

14. An analytical method for measuring the amount of starch in a solution containing a plurality of carbohydrates but no unoxidized glucose, comprising hydrolyzing the starch with amylase to obtain the glucose moiety, subsequently oxidizing the glucose stoichiometrically to gluconic acid by reacting the glucose with oxygen in the presence of notatin, and measuring the change in optical rotation resulting from the reaction by means of a differential polarimeter with a sensitivity of 2 ten thousandths of a circular degree (0.0002°).

References Cited

Colowick et al., Methods in Enzymology vol. III, pp. 107–110 (1957).

ALVIN E. TANENHOLTZ, *Primary Examiner.*